(12) United States Patent
Take

(10) Patent No.: US 11,866,931 B2
(45) Date of Patent: Jan. 9, 2024

(54) INCOMBUSTIBLE SOUND ABSORPTION PANEL

(71) Applicant: SHIZUKA Co., Ltd., Atsugi (JP)

(72) Inventor: Koichi Take, Yokohama (JP)

(73) Assignee: SHIZUKA CO., LTD., Atsugi (JP)

( * ) Notice: Subject to any disclaimer, the term of this patent is extended or adjusted under 35 U.S.C. 154(b) by 663 days.

(21) Appl. No.: 17/053,166

(22) PCT Filed: Jun. 30, 2020

(86) PCT No.: PCT/JP2020/025679
§ 371 (c)(1),
(2) Date: Nov. 5, 2020

(87) PCT Pub. No.: WO2021/010160
PCT Pub. Date: Jan. 21, 2021

(65) Prior Publication Data
US 2023/0151605 A1 May 18, 2023

(30) Foreign Application Priority Data
Jul. 12, 2019 (JP) .................................. 2019-130061

(51) Int. Cl.
*E04B 1/94* (2006.01)
*B32B 3/12* (2006.01)
(Continued)

(52) U.S. Cl.
CPC .............. *E04B 1/942* (2013.01); *B32B 3/12* (2013.01); *B32B 3/18* (2013.01); *B32B 5/02* (2013.01);
(Continued)

(58) Field of Classification Search
CPC .... B32B 3/12; B32B 3/18; B32B 5/02; B32B 5/16; B32B 5/30; B32B 7/12;
(Continued)

(56) References Cited

U.S. PATENT DOCUMENTS 4,004,387 A * 1/1977 Ellingson ................ E04C 2/205
52/406.1
4,828,932 A * 5/1989 Morimoto ................ E04C 2/08
181/294

(Continued)

FOREIGN PATENT DOCUMENTS

CA 2615699 A1 * 1/2007 ............ B29C 73/22
CN 202990095 U * 6/2013

(Continued)

*Primary Examiner* — James M Ference
(74) *Attorney, Agent, or Firm* — Kratz, Quintos & Hanson, LLP

(57) ABSTRACT

[Problem to be Solved] To attain an incombustible sound absorption panel by providing incombustibility to a sound absorption/insulation sandwich panel containing a combustible material as a constituting material.

[Solution to Problem] Fine powder of chips generated during cutting of a foam material to fill in a honeycomb material is located in a gap between the foam material and a sound absorption surface material. A gap between fibers of the sound absorption surface material is blocked by the chips having been moved by a flow such as a water vapor flow generated from hydrate of the honeycomb material heated on the occurrence of a fire. As a result, an air flow path is limited. Further, carbon dioxide gas generated from the foam material is trapped to reduce an oxygen amount, thereby inhibiting combustion. Usage of an adhesive as a combustible material is reduced.

10 Claims, 12 Drawing Sheets

(51) Int. Cl.
| | |
|---|---|
| *B32B 3/18* | (2006.01) |
| *B32B 5/02* | (2006.01) |
| *B32B 5/16* | (2006.01) |
| *B32B 5/30* | (2006.01) |
| *B32B 7/12* | (2006.01) |
| *E04B 1/86* | (2006.01) |
| *B32B 15/12* | (2006.01) |
| *B32B 15/20* | (2006.01) |
| *B32B 29/04* | (2006.01) |
| *E04B 1/74* | (2006.01) |
| *E04B 1/84* | (2006.01) |

(52) U.S. Cl.
CPC ................. *B32B 5/16* (2013.01); *B32B 5/30* (2013.01); *B32B 7/12* (2013.01); *E04B 1/86* (2013.01); *E04B 1/947* (2013.01); *B32B 15/12* (2013.01); *B32B 15/20* (2013.01); *B32B 29/04* (2013.01); *B32B 2255/06* (2013.01); *B32B 2255/26* (2013.01); *B32B 2255/28* (2013.01); *B32B 2262/101* (2013.01); *B32B 2262/103* (2013.01); *B32B 2262/108* (2013.01); *B32B 2264/303* (2020.08); *B32B 2266/0285* (2013.01); *B32B 2266/06* (2013.01); *B32B 2307/102* (2013.01); *B32B 2307/3065* (2013.01); *B32B 2307/724* (2013.01); *B32B 2307/7242* (2013.01); *E04B 2001/748* (2013.01); *E04B 2001/8471* (2013.01)

(58) Field of Classification Search
CPC ........ B32B 15/12; B32B 15/20; B32B 29/04; B32B 2255/06; B32B 2255/26; B32B 2255/28; B32B 2262/101; B32B 2262/103; B32B 2262/108; B32B 2262/2264; B32B 2262/303; B32B 2266/0285; B32B 2266/06; B32B 2307/102; B32B 2307/3065; B32B 2307/724; B32B 2307/7242; E04B 1/86; E04B 1/942; E04B 1/947; E04B 2001/748; E04B 2001/8471; E04C 2/205; E04C 2/284; E04C 2/294; E04C 2/365; E04C 2/528
See application file for complete search history.

(56) References Cited

U.S. PATENT DOCUMENTS

| | | | | |
|---|---|---|---|---|
| 2015/0284947 | A1* | 10/2015 | Take | G10K 11/172 |
| | | | | 181/292 |
| 2018/0105690 | A1* | 4/2018 | Kaneko | C08L 33/10 |
| 2023/0151605 | A1* | 5/2023 | Take | B32B 3/18 |
| | | | | 52/232 |

FOREIGN PATENT DOCUMENTS

| | | | | |
|---|---|---|---|---|
| DE | 20112669 | U1 * | 8/2002 | ............ E04B 1/86 |
| EP | 2530113 | A1 * | 12/2012 | .......... C08J 9/0066 |
| JP | H10169082 | A * | 6/1998 | |
| JP | 6292339 | B1 * | 3/2018 | ............ B32B 15/02 |
| KR | 20090022753 | A * | 6/1998 | |
| KR | 100759024 | B1 * | 9/2007 | |
| KR | 20080051248 | A * | 6/2008 | |

\* cited by examiner

Fig. 7

| MIN | 1 | 2 | 3 | 4 | 5 | 6 | 7 | 8 | AVG | DC |
|---|---|---|---|---|---|---|---|---|---|---|
| MAT(M) | 15 | 12.9 | 15 | 15 | 15 | 15 | 15 | 15 | 14.7 | 6.8 AVG |
| MGC | $CO_2$ : 1.46%  CO : 0.06%  $O_2$ : 18.7% | | | | | | | | | |

Note
- MIN : Mouse Individual Number
- MAT(M) : Mouse Active Time (Minutes)
- MGC : Maximum GAS Concentration
- AVG : Average
- DC : Determination Criterion

Fig. 10

| MIN | 1 | 2 | 3 | 4 | 5 | 6 | 7 | 8 | AVG | DC |
|---|---|---|---|---|---|---|---|---|---|---|
| MAT(M) | 8.5 | 12.8 | 8.2 | 15 | 15 | 11 | 13.8 | 14 | 12.29 | 6.8 AVG |
| MGC | $CO_2$ : 1.34%  CO : 0.03%  $O_2$ : 18.9% | | | | | | | | | |

Note
- MIN : Mouse Individual Number
- MAT(M) : Mouse Active Time (Minutes)
- MGC : Maximum GAS Concentration
- AVG : Average
- DC : Determination Criterion

INCOMBUSTIBLE SOUND ABSORPTION PANEL

TECHNICAL FIELD

The present invention relates to a light-weight, thin, and high-stiffness incombustible sound absorption panel having excellent sound absorption/insulation properties.

BACKGROUND ART

Plastic products made of polymer materials are used in many application areas. These products generally have properties of being combustible, generating large combustion energy, and being burned at high rates, etc. This imposes serious difficulty in technology development for fire protection and provision of incombustibility, failing to provide prevention of a serious result in response to the occurrence of a fire accident. This further causes a problem on the occurrence of a fire accident that a large amount of smoke is caused by incomplete combustion accompanied by poisonous gas resulting from decomposition.
While there are statutory regulations for incombustibility and fire resistance, sufficient action has still yet to be taken to attain techniques such as those for providing flame resistance and incombustibility of materials. Attaining such techniques have become more important issues in terms of respect for life.

It is not technically easy to attain an incombustible sound absorption panel conforming to the regulations (for incombustible materials) defined in Article 2, Item 9 and Article 108-2, Items 1 to 3 of the Building Standards Act, particularly in the use of a composite material containing an organic matter.
Nevertheless, products demanded in the market are light-weight and thin products with high-quality composite performances. These demands cannot be fulfilled by the performance of general inorganic matters already recognized as being incombustible under the Building Standards Act.
A plaster board as a ceiling material will be described as an example. While a plaster board is used in many cases as an incombustible sound insulation material, it has disadvantages in terms of being heavy, brittle, etc., and causes a risk of ceiling falling due to an earthquake. A plaster board does not have heat-insulating properties, humidity conditioning properties and sound absorption properties, so that it is also inappropriate as a significant energy-saving material as a ceiling material or as a sound absorption material fulfilling silence.

A technique relating to provision of incombustibility to a honeycomb panel commonly used as a sound absorption panel has been suggested. This panel is prepared by sandwiching a honeycomb material between incombustible materials without air permeability based on metal such as aluminum from opposite sides of the honeycomb material. Even while a combustible adhesive is used, incombustibility is still attained by selecting a material of the honeycomb material from aluminum, aluminum hydroxide, magnesium silicate as a ceramic-based material, and an aramid material (patent literature 1).

This suggested structure attains an incombustible sound absorption panel.
As the honeycomb material is sandwiched between the incombustible materials without air permeability from opposite sides of the honeycomb material, however, even in the presence of a foam material filling the honeycomb material, a problem of low sound absorption properties still occurs.

According to another suggested technique relating to a honeycomb panel, three materials including an air-permeable surface material, a honeycomb material filled with a foam material, and a sound insulation surface material are fixed with an adhesive to obtain excellent sound absorption/insulation properties and high stiffness (patent literature 2).
This technique has a problem of failing to attain incombustibility according to which material is selected for the foam material, which material is selected for the honeycomb material, or which adhesive is selected. Referring to the foam material, even if an open-cell foam material generally used is heated to become carbonized on the occurrence of a fire, air bubbles do not collapse but continuity between the air bubbles is maintained and thus air permeability is maintained between the air-permeable material and the foam material, failing to provide incombustibility.
Referring further to the adhesive, many adhesives generally used belong to Class 4 dangerous goods. This causes a problem that increased usage prevents provision of flame resistance to products.
A large amount of adhesive further has a problem of leading to cost increase.

According to another suggested technique relating to a honeycomb panel, incombustibility is provided by using an incombustible or flame-resistant honeycomb material, interposing the honeycomb material between metallic surface materials from opposite sides of the honeycomb material, and providing an incombustible inorganic plate between at least one of the metallic surface materials and the honeycomb material (patent literature 3).

This suggested structure attains an incombustible honeycomb panel.
According to this technique, however, the honeycomb material is not filled with a sound absorption material, failing to provide sound absorption properties.
There is also another technique relating to a honeycomb panel. To provide a honeycomb panel with heat-insulating and sound absorption/insulation functions, space in a cell of a honeycomb material is filled with a foam material. Chips of the foam material generated during the filling may be interposed between the honeycomb material and an air-permeable surface plate, and this may cause adhesive force reduction. This technique provides suggestion for a method of compensating for the adhesive force in such a case (patent literature 4).

This suggested structure attains a honeycomb panel with heat-insulating and sound absorption/insulation functions. However, there is no mention about provision of incombustibility to the panel.

CITATION LIST

Patent Literatures

Patent Literature 1: Publication of Japanese Patent No. 3806733
Patent Literature 2: Publication of Japanese Patent No. 3806744
Patent Literature 3: Japanese Patent Application No. Sho 61-185436
Patent Literature 4: Publication of Japanese Patent No. 6065345

SUMMARY OF INVENTION

Technical Problem

A problem to be to solved is to attain an incombustible sound absorption panel in which incombustibility is provided to a honeycomb panel containing a combustible material as a constituting material and having heat-insulating and sound absorption/insulation functions.

Solution to Problem

Combustion is sustained by three conditional elements, oxygen, a combustible material, and an ignition source. Removing one of these three elements is sufficient as means for providing incombustibility. The present invention derives elements of incombustibility such as oxygen insulation realized by limiting an air flow path, oxygen deficiency generated by making use of produced inert gas, and suppression of the content of a combustible material from the structure and properties of a material.

This can be said as follows.

(1) To limit an air flow path, chips generated during cutting of a foam material are left positively on a surface of the foam material and used as a clogging material for limiting air flow in a gap between fibers of a fiber material on the occurrence of a fire.

(2) Combustible gas is diluted with inert gas generated during combustion of part of the foam material in a fire to generate oxygen deficiency.

(3) Other conditions for complementing provision of incombustibility

A material made of hydrate causes endothermic reaction (dehydration reaction) when heated to facilitate material carbonization at a low temperature.

To retain a panel shape even during heating, an adhesive to be sintered by the heating is selected.

A material of a low content of a combustible organic matter is selected.

Advantageous Effects of Invention

The incombustible sound absorption panel of the present invention fulfills the following conditions defined in Article 2, Item 9 of the Building Standards Act.

(1) A total value of heat released in 20 minutes after start of heating should be up to 8 MJ/m$^2$.

(2) A maximum heat release rate should be controlled not to exceed 200 kW m$^2$ continuously for 10 seconds in 20 minutes after start of heating.

(3) The occurrence of a through crack and a through hole reaching a back surface harmful to fire protection should be prevented for 20 minutes after start of heating.

(4) Catching of fire should be prevented.

In a gas toxicity test, survival times of all mice should exceed 6.8 minutes.

BRIEF DESCRIPTION OF DRAWINGS

FIG. 7 is a table showing result of a gas toxicity test according to Example 1;

FIG. 10 is a table showing result of a gas toxicity test according to Example 2;

DESCRIPTIONS OF EMBODIMENTS

Example 1

Figure 1:
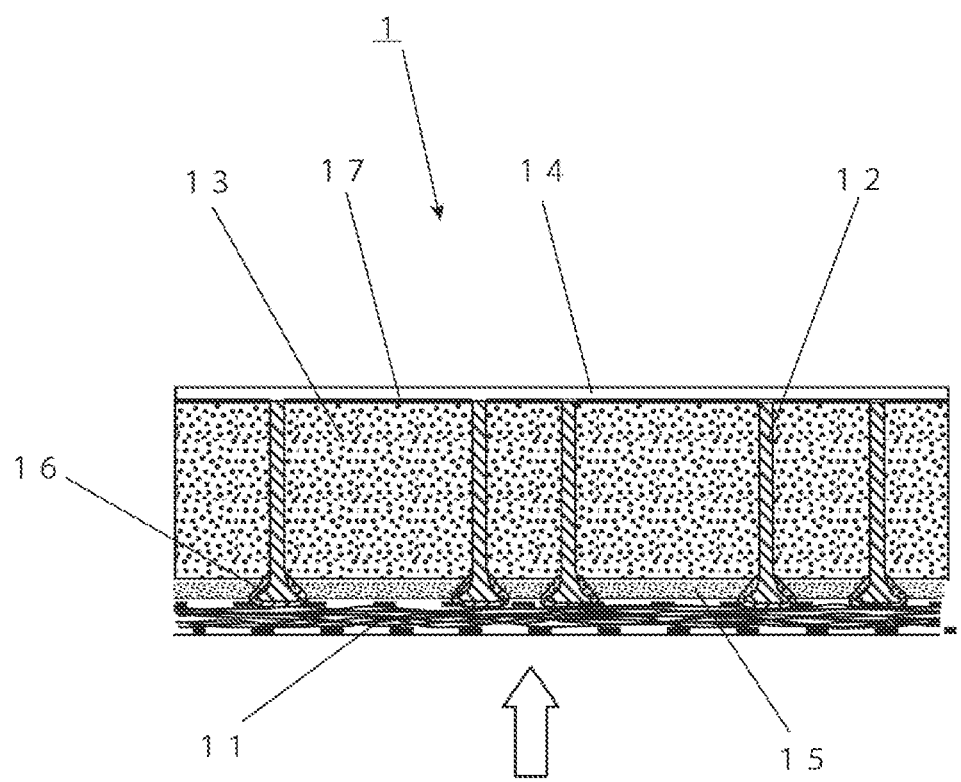
FIG. 1 is a cross-sectional view of an incombustible sound absorption panel.

An embodiment for carrying out the present invention will be described below in detail by referring to the drawings and tables. Structures and materials will be described first. FIG. 1 is a cross-sectional view of an incombustible sound absorption panel according to the present invention. An incombustible sound absorption panel 1 is composed of a sound absorption surface material 11, a honeycomb material 12, a foam material 13, a sound insulation material 14, and a layer of chips 15 between the honeycomb material 12 and the foam material 13.

The sound absorption surface material 11 has a sandwich structure with an aluminum fiber material sandwiched between an expanded metal of a thickness of 0.4 mm and an expanded metal of a thickness of 0.6 mm from opposite sides of the aluminum fiber material. The aluminum fiber material is a material having a multilayer structure formed by compressing aluminum fibers as a raw material three dimensionally. The aluminum fiber material to be used conforms to JISH2102, and has purity of equal to or greater than 99.5%, an open area ratio of 40% a fiber diameter of equal to or less than 100 μm, a fiber stacked volume of equal to or greater than 16 layers, and a gap between fibers of equal to or less than 100 μm. The aluminum fiber material sandwiched between the expanded metals has a total thickness of equal to or greater than 1.6 mm, desirably, in a range from 1.61 to 1.8 mm with a fiber stacked volume of equal to or greater than 16 layers, a high fiber density (namely, with a low open area ratio) and not a large amount of weight, and available at reasonable cost.

The honeycomb material 12 functions as a skeleton for retaining the shape of the panel. The honeycomb material 12 is made of paper as a material containing a combustible organic matter prepared by mixing hydrate, for example, into pulp. The honeycomb material 12 has a thickness of 30 mm.

The foam material 13 is plastic foam made of rigid phenol. Air bubbles have an open-cell structure and have non-electrostatic properties. A material thinner than the honeycomb material is used as the foam material 13 for reason described later. The foam material 13 is to provide the incombustible sound absorption panel with a sound absorption function.

A material of the sound absorption surface material 11 is not limited to metal. A material also appropriate includes SMG super glass mat (available from YAMATO RIKEN KOGYO CO., LTD.) or CGM ceramic glass mat (available from YAMATO RIKEN KOGYO CO., LTD.) that are inorganic fiber materials made of needle-punched glass fibers or rock wool, for example. In this case, a fiber diameter, a fiber density, and a fiber thickness become important issues. For inorganic fibers such as glass fibers or rock wool, an appropriate range desirably conforms to conditions that a fiber diameter is from 5 to 7 μm, a fiber density is from 90 to 150 kg/m$^2$, and a fiber thickness is from 3.0 to 10 mm. As a prerequisite, a material to be used is a qualified material under the Building Standards Act.

The sound insulation material 14 functions to provide incombustibility and sound insulation. A material used as the sound insulation material 14 is an aluminum plate of a thickness of 1.2 mm conforming to JISH4000 with alloy number A1050P-H24, and having a front surface with a coating with polymer polyester-based resin of 0.015 mm and a coating with epoxy/polyester-based resin of 0.005 mm and a back surface with a urethane/epoxy-based coating of 0.005 mm.

An application amount of a baking paint used for the coating is suppressed to prevent catching of fire. The thickness and material of the sound insulation material are not limited. An uncoated aluminum plate conforming to JIS A 5052P-H24 was further subjected to an incombustibility test and the incombustibility performance thereof was confirmed.

The composition of the honeycomb material plays an important role for provision of incombustibility. The composition of the honeycomb material of a cell size of 20 mm used in this example includes 70 to 80% of magnesium silicate hydrate, 3 to 5% of silica, 14 to 24% of pulp as an organic matter, and 1 to 3% of other organic matters. The honeycomb material having this composition can be carbonized to retain its shape when heated in the presence of carbon dioxide gas or in a condition of subtle oxygen.

Magnesium silicate hydrate in the honeycomb material may be replaced with aluminum hydroxide hydrate (an exemplary composition of the honeycomb material: 74% of aluminum hydroxide hydrate, 20% of pulp, and 6% of a binder).

The honeycomb material may be a metallic honeycomb material. The metallic honeycomb material does not contain an organic matter as a material, so that this easily leads to provision of incombustibility.

The rigid phenolic foam material 13 occupies an important role for provision of incombustibility according to the present invention. The phenolic foam material 13 has an open-cell structure, a density from 15 to 25 kg/m$^3$ (desirably, from 17 to 21 kg/m$^3$), a thickness of 30 mm, and non-electrostatic properties. A material of the phenolic foam material 13 is phenolic resin made of phenol and formaldehyde as raw materials. This material has high heat resistance and produces not a large amount of smoke during combustion as a result of its chemical structure. By being burned by heat, this material emits carbon dioxide gas and a small amount, of combustible carbon monoxide gas, and is carbonized to produce a residue after the emission.

A material to become a core of the incombustible sound absorption panel of the present invention is composed of the honeycomb material, the phenolic foam material, and an adhesive. The phenolic foam material occupies 85% of a volume or more and has an oxygen index of equal to or greater than 28. This fulfills a range of equal to or greater than 26 by which the material is determined to be flame resistant, thereby contributing to inhibition of combustion. In addition to having such an oxygen index, the phenolic foam material functions to insulate heat as it remains in a carbonized state after heating and functions as a support for a honeycomb material wall as it retains its structure.

The phenolic foam material is composed of continuous air bubbles of sizes of about 100 μm. The continuous air bubbles have spherical shapes with partial cutouts. During cutting, chips in substantial quantities are generated and the chips adhere entirely to the foam material. Generally, the chips are sucked and removed beforehand as they become hindrances to adhesion. According to the present invention, however, the chips are left positively.

These chips stay in continuous air bubbles existing on a cutting surface or near the air bubbles. As the non-electrostatic properties are selected, the chips do not gather to become solid but they are in individually independent and freely movable states. This makes the chips easy to move as individual particles along an air current in the structure, as will be described later. The thicknesses of the layers of the chips 15 shown in FIGS. 1 to 5 are exaggerated.

The honeycomb material 11 supporting the structure and the aluminum fiber material sandwiched between the expanded metals s adhesively bonded to each other with an emulsion-based adhesive 16. The honeycomb material 11 and the sound insulation material 14 are adhesively bonded to each other with an epoxy-based adhesive 17. The epoxy-based adhesive 17 is a combustible material classified in Class 4 dangerous goods.

A vinyl acetate-based emulsion adhesive (Konishi CX50 containing 53.5 to 56.5% of moisture) was used as the adhesive 16 for adhesively bonding between the aluminum fiber material sandwiched between the expanded metals as the sound absorption surface material 11 and the honeycomb material 12 supporting the entire structure. This adhesive is available for use in achieving the effect of inhibiting heat energy supply by means of endothermic reaction (dehydration reaction) caused by moisture in the adhesive to inhibit combustion. At the same time, in the presence of carbon dioxide gas, this adhesive remains as resin in a carbonized state and resultant carbide is used for sintering the sound absorption surface material 11 and the foam material 13.

If the adhesive 16 to adhere to the honeycomb material 12 is applied large amounts, a large amount of water vapor is generated. This causes separation at the adhesive part to destroy the enclosed structure. Conversely, a small amount of the adhesive 16 results in poor adhesion performance to cause a trouble in retaining the panel structure. An appropriate amount of the adhesive 16 was determined to be in a range from 60 to 120 g/m$^2$. The emulsion-based adhesive is not limited to the vinyl acetate-based adhesive.

The epoxy-based adhesive 17 is used for adhesive bonding between the honeycomb material 12 and the aluminum plate as the sound insulation material 14. The composition of the epoxy-based adhesive includes 51 to 56% of epoxy resin and 44 to 49% of silica. The epoxy-based adhesive is applied uniformly (300 g/m$^2$) to an entire surface of the aluminum plate 14 as the sound insulation material 14 for the adhesive bonding.

While the epoxy-based adhesive 17 belongs to Class 4 dangerous goods, the composition thereof includes 44 to 49% of silica as an inorganic matter to realize suppression of the amount of combustible gas to be generated. The inclusion of the inorganic matter causes sintering of a residue resulting from a mixture of the honeycomb material and the adhesive resin, thereby allowing the incombustible sound absorption panel 1 to retain its structure. The combustible gas generated by heating from the adhesive is diluted with carbon dioxide gas generated from the constituting material to inhibit combustion. An application amount is an important issue. In terms of provision of incombustibility and adhesion strength, the application amount is desirably within a range from 250 to 300 g/m$^2$. The adhesive of an amount of 300 g/m$^2$ was used in an incombustible sound absorption panel fulfilling the condition defined in Article 2, item 9 of the Building Standards Act.

Figure 2:
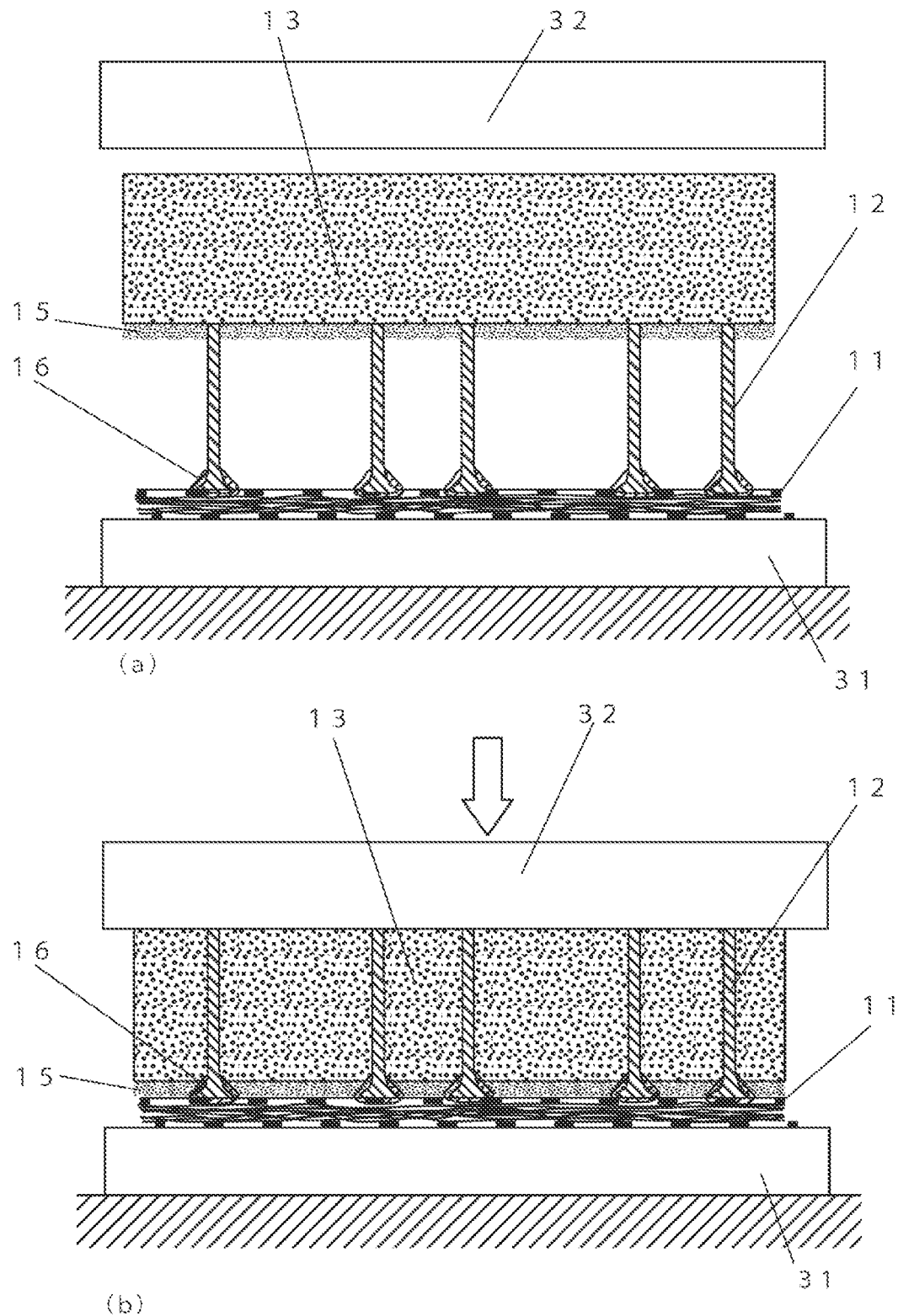
FIG. 2 is a cross-sectional view for explaining a method of manufacturing the incombustible sound absorption panel.

Manufacturing steps will be described next. FIG. 2 is a view for explaining a method of manufacturing the incombustible sound absorption panel. First, the aluminum fiber material sandwiched between the expanded metals as the sound absorption surface material 11 is placed on a lower press platen 31. Next, a tip of the honeycomb material 12 of a thickness of 30 mm kept in a horizontal position is dipped in a pool of the adhesive to make the emulsion-based adhesive 16 adhere only to the tip portion. The honeycomb material 12 in this state is placed on the aluminum fiber material sandwiched between the expanded metals as the sound absorption surface material 11 from above to face the aluminum fiber material, thereby adhesively bonding the honeycomb material 12 to the aluminum fiber material.

FIG. 2(a) which corresponds to the area pointed to by (a) in FIG. 2 except a vertical line between (a) and (b), shows a state before heating, and 2(b), which corresponds to the area pointed by (b) in FIG. 2 except the vertical line, shows after heating for comparison. Then, as shown in FIG. 2(a), the non-electrostatic open-cell rigid phenolic foam material 13 of a thickness of 29.0 mm plus or minus 0.5 mm is placed on the honeycomb material 12 and is pressed in with an upper press platen 32, By doing so, as shown in FIG. 2(b), space in a cell of the honeycomb material 12 is filled with the foam material 13. Next, the epoxy-based adhesive 17 is applied uniformly to an entire surface of the aluminum material as the sound insulation material 14 and the aluminum material is placed on the upper surface of the honeycomb material 12. Then, pressure is applied again with the lower press platen 21 and the upper press platen 22 for adhesive bonding. As a result, the incombustible sound absorption panel shown in FIG. 1 is obtained.

The foam material 13 is formed into a smaller thickness than the honeycomb material 12 to provide a gap between the aluminum fiber material surface sandwiched between the expanded metals as the sound absorption surface material 11 and a surface of the open-cell rigid phenolic foam material 13. By doing so, the chips 13 adhering to the foam material 13 are trapped into this gap to form a layer of the chips 15.

The chips 15 are obtained as fine particles formed into sizes in a range from 10 to 100 μm by adjusting a saw blade used in cutting the foam material 13 into a predetermined size and a predetermined thickness. Generally, chips become a source for generation of dust during use of a product, a troublesome factor of adhesion during a manufacturing step by adhesive bonding, a factor of working environmental degradation, etc. In particular, in the step of adhesive bonding between the sound absorption surface material 11 and the honeycomb material 12 during manufacture of the incombustible sound absorption panel, the presence of chips adhering to an adhesive surface deters the adhesive bonding. This causes a problem that the adhesive bonding step can be performed only after implementation of a surface cleaning step of removing the chips precisely.

To solve this problem, the sound absorption surface material 11 and the honeycomb material 12 are adhesively bonded to each other beforehand on condition that no chip to deter the adhesive bonding is present. Then, the honeycomb material 12 is filled with the foam material 13 while chips generated during cutting remain adhering to the foam material 13.

Thus, the chips 15 do not adhere to the honeycomb material 12 or to the aluminum fiber material as the sound absorption surface material 11 at the adhesive bonding stage. This eliminates a troublesome factor of adhesion or does not cause working environmental degradation, etc. Conversely, at the stage of filling with the foam material 13, the chips 15 adhering to the surface of the foam material 13 are available for use as means of providing incombustibility. To cause the chips to move as individually independent particles by means of static electricity without making the chips adhere to the surface of the foam material 13, the non-electrostatic foam material 13 was selected.

The following describes the action of providing incombustibility to the incombustible sound absorption panel in terms of the materials, structures, and manufacturing steps described above. The present invention is intended for the incombustible sound absorption panel and this is the sound absorption/insulation sandwich panel in terms of function. Thus, a fiber material having air permeability suitable for sound absorption is arranged at a surface of sound incidence, and a plate without air permeability to insulate sound is arranged at the other surface.

The sound absorption surface material having air permeability occupies an important role for provision of incombustibility to the sound absorption/insulation panel. The sound absorption surface material is required to fulfill two functions simultaneously that might be mutually contradictory, providing flow of air (sound absorption) and limiting an air flow path (oxygen insulation). To fulfill a sound absorption function using a fiber material or a porous material, incombustibility is generally provided by choosing an incombustible material. The present invention is further intended to achieve means of providing incombustibility by reducing oxygen supply and making use of inert gas such as carbon dioxide gas generated in the panel.

According to the properties of the phenolic foam material having a closed-cell structure, when the phenolic foam material is burned, a residue remaining on a surface makes oxygen hard to go into the material, thereby making toxic gas unlikely to be generated. By contrast, regarding open-cell phenolic foam having excellent sound absorption properties, even when this foam is burned to become carbonized, air bubbles do not col lapse but continuity between the air bubbles is maintained. For this reason, this foam has a disadvantage of failing to provide incombustibility as a result of air permeability maintained even on the occurrence of a fire.

In response to the foregoing problem, an appropriate solution to provision of incombustibility has been found by using the chips generated during manufacture of the foam material as a core, and by combining the aluminum fiber material sandwiched between the expanded metals as the sound absorption surface material.

Figure 4:
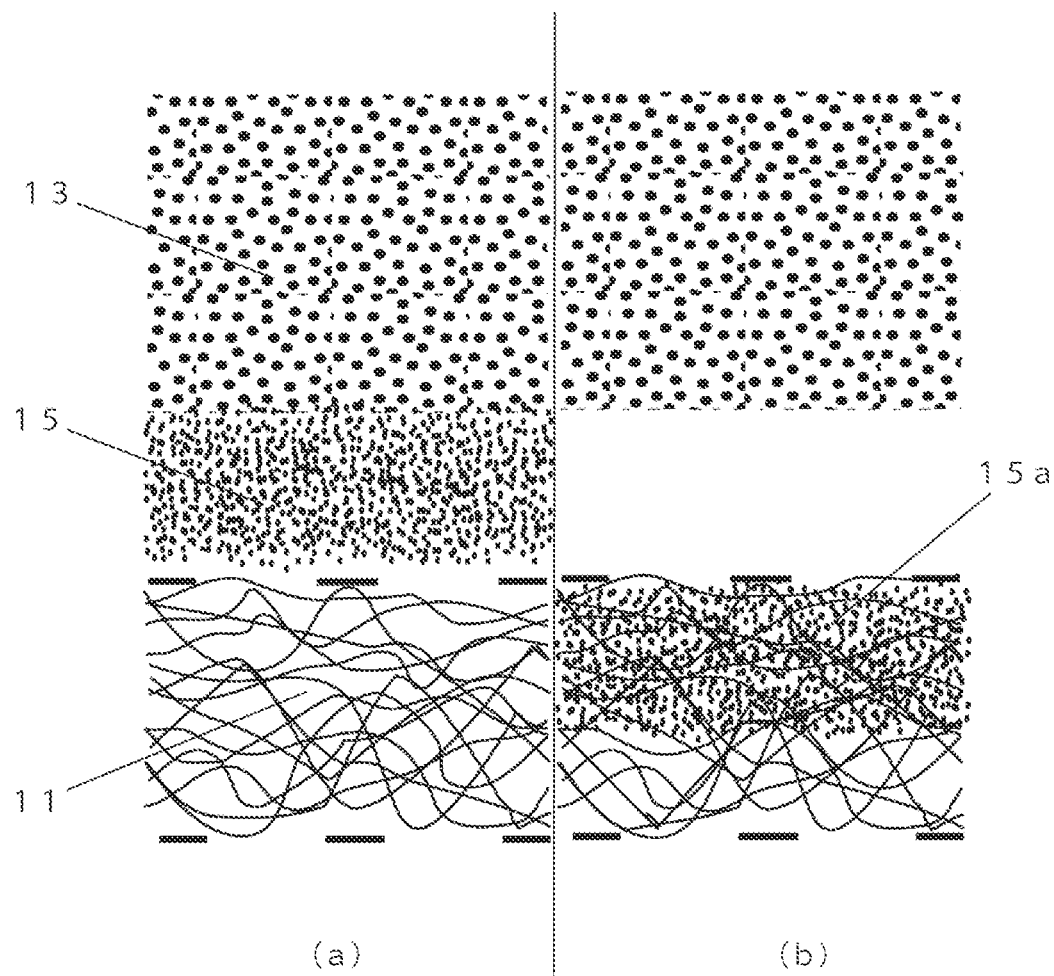
FIG. 4 is a cross-sectional view for explaining chips having been moved by a flow of water vapor.

Means of providing incombustibility using the chips 15 as a core will be described. 4 is a cross-sectional view for explaining chips having been moved by a flow of water vapor. FIG. 4(a), which corresponds to the area pointed to by (a) in FIG. 4 except a vertical line between (a and (b), shows a state before heating, and FIG. 4(b) which corresponds to the area pointed by (b) in FIG. 4 except the vertical line, shows after heating for comparison. The sound absorption surface 11 is an aluminum fiber material and allows air to pass freely. Blocking a gap in the aluminum fiber material on the occurrence of a fire acts to inhibit oxygen. As shown in FIG. 4(a), the chips 15 form a layer in a gap between a surface of the phenolic foam, material 13 and a surface of the sound absorption surface material 11.

As shown in FIG. 4(b), when the panel is heated, some of the chips 15 are moved from the surface of the aluminum fiber material by the pressure of water vapor generated from hydrate forming the honeycomb material 12 along a flow of the emitted water vapor passing through gaps between fibers. Then, these chips adhere to the fibers and block the gaps to become chips 15a (expressed by a group of tiny dots in the drawing) having been moved by the water vapor. As a result of blocking of the gaps, air flow, namely, the amount of oxygen is limited.

Figure 5:
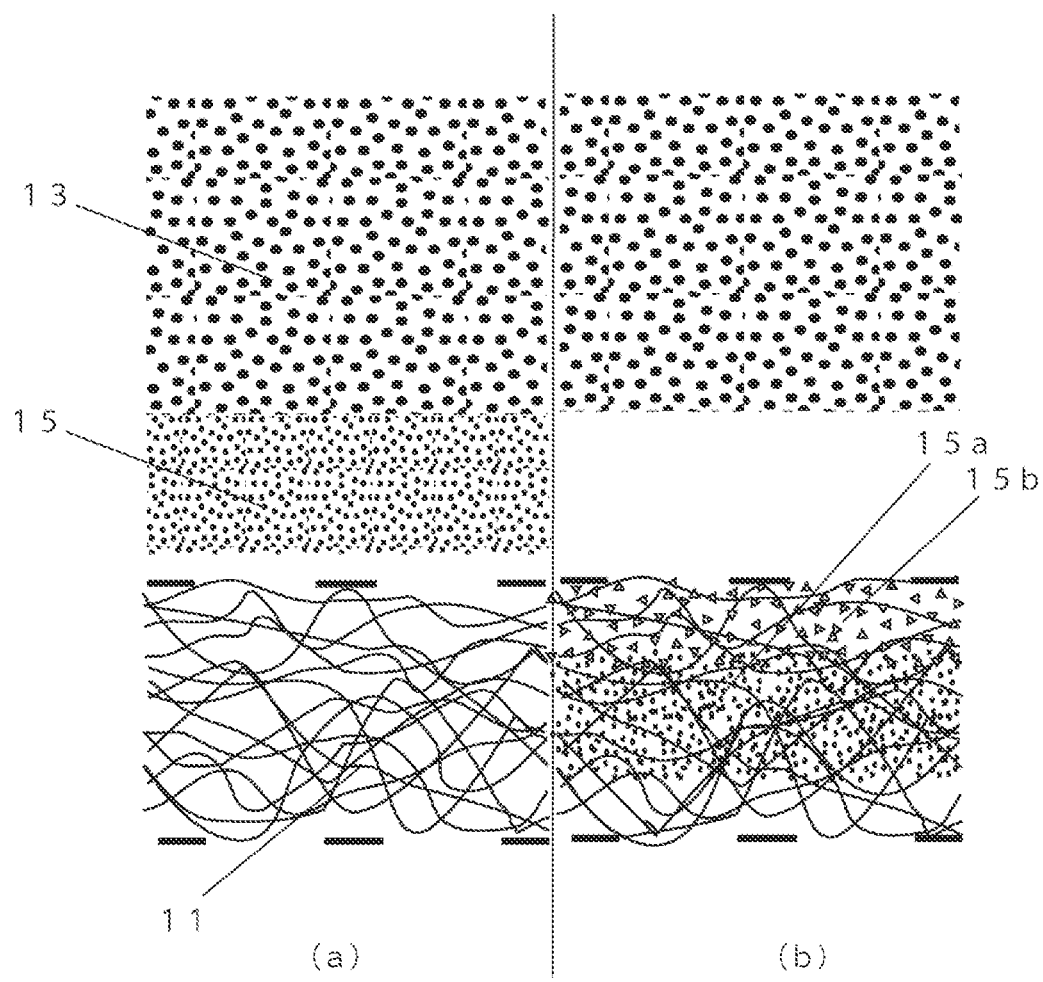
FIG. 5 is a cross-sectional view for explaining the chips having been moved by a flow of hydrolysate.

FIG. 5(a), which corresponds to the area pointed to by (a) in FIG. 5 except a vertical line between (a) and (b), shows a state before heating, and FIG. 5(b), which corresponds to the area pointed by (b) in FIG. 5 except the vertical line, shows after heating for comparison. FIG. 5(b) shows a state in which, in a continued heating condition, carbide liberated from brittle air bubble walls of the phenolic foam material 13 or from their vicinities is caused to go into the gaps between the fibers of the aluminum fiber material by a flow of gas resulting from heat decomposition of the component of the phenolic foam material 13 and increases the clogging, thereby becoming carbide 15b (expressed as a group of tiny triangles in the drawing) having been moved by the gas resulting from the heat decomposition.

As a result of the clogging, carbon dioxide gas generated during the process of the heat decomposition by the heating is trapped into the structure to act in such a manner as to inhibit combustion of combustible gas generated from the adhesive.

The effect of blocking the gaps between the fibers using the clogging is not always required to be fulfilled completely.

As already described, the chips 15 are generated during cutting of the phenolic foam material 13. After filling the honeycomb material 12, the chips 15 are trapped in the gap between the aluminum fiber material as the sound absorption surface material 11 and the phenolic foam material 13 while remaining adhering to the cutting surface of the phenolic foam material 13, as described by referring to FIG. 1. This prevents the chips 15 from dropping out even during use of the incombustible sound absorption panel.

An experiment was conducted to determine whether the fibers in the multilayer structure of the aluminum fiber material have the function of preventing passage of the chips as fine particles. According to a method employed as a measurement testing method of determining dusting properties, air was sucked from the foam material 13 in a direction toward the sound absorption surface material 11. If the presence of the chips 15 is not confirmed outside, it is determined that the chips are trapped in the gaps between the fibers and thus do not exit the gaps. This shows that, during heating, carbonized chips block the gaps between the aluminum fibers to reduce air flow.

Figure 6:
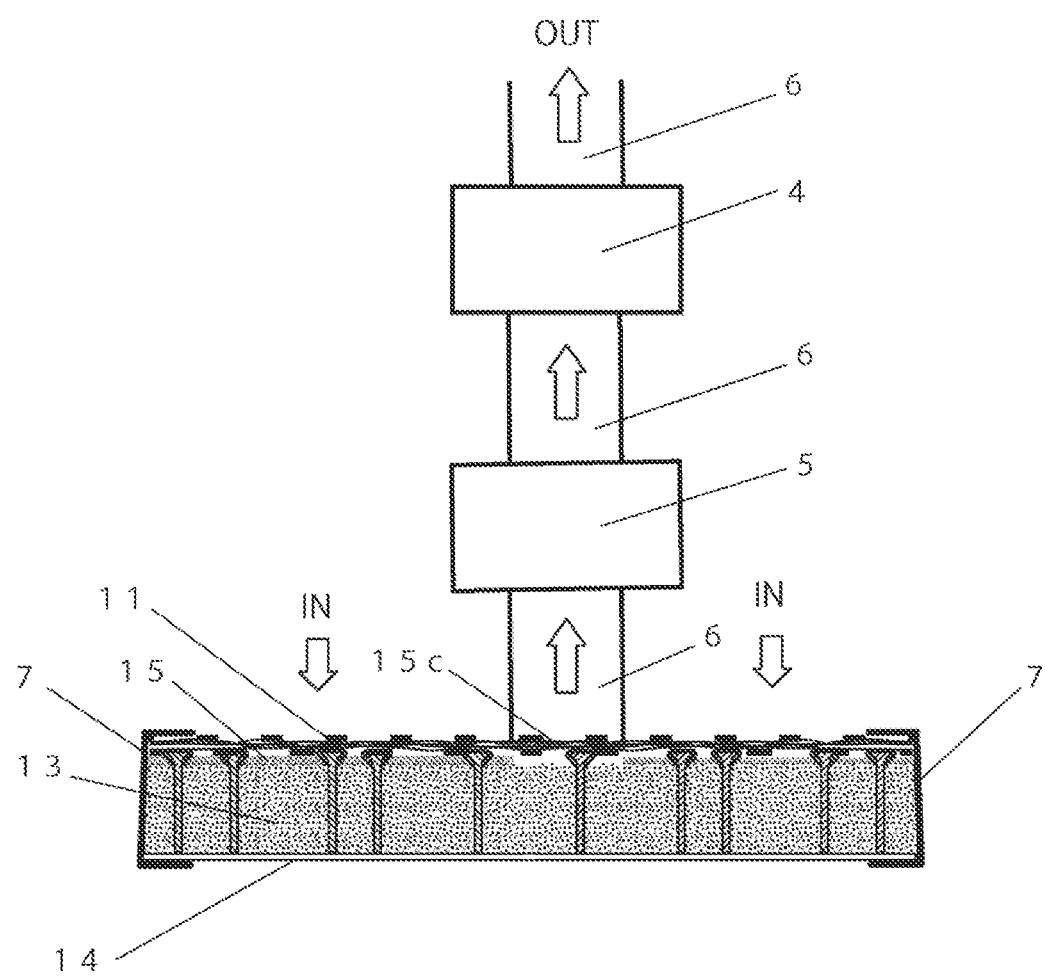
FIG. 6 is a cross-sectional view of an outgoing testing device to confirm the absence of outgoing of the chips from a sound absorption surface material to the outside.

FIG. 6 is a cross-sectional view of an outgoing testing device to confirm the absence of outgoing of the chips from the sound absorption surface material to the outside. As shown in FIG. 6, a measurement method to determine outgoing of the chips 15 trapped in between the sound absorption surface material 11 and the foam material 13 was conducted by feeding clean air from above to the incombustible sound absorption panel at an air speed of 0.5 m/s as shown by downward arrows in the drawing, sucking air from a side where the sound absorption surface material 11 is provided, and measuring the volume of the outgoing chips 15 using an air particle counter provided in an air flow path 6.

For measurement of the volume of outgoing chips 15, an air particle counter (TS6500 model, available from Hitachi High-Tech DE Technology Co., Ltd.) was used to measure the volume of outgoing chips 15c. The measurement was made under conditions of a flow rate of 28.3 L/min plus or minus 5.66 L/min, 10 minutes, and a particle size from 10 to 100 µm.

Result of this test is such that, as a count of the air particle counter was zero, a conclusion showing no emission to the outside from the incombustible sound absorption panel was derived.

The absence of emission to the outside means that the chips 15 forming a layer between the sound absorption surface material 11 and the foam material 13 move into the aluminum fiber material to become the moved chips 15a staying in the gaps between the fibers and causing clogging, as shown in FIG. 4. Specifically, when heated in a fire, the chips fulfill the effect of reducing flow of air, namely, reducing oxygen supply.

All the actions relating to provision of incombustibility will be described as a whole. The chips 15 are moved into the gaps between the fibers of the sound absorption surface material 11 by a flow of water vapor generated during heating, adhere to the fibers and are carbonized by the heating, and cause clogging, leading to the effect of oxygen deficiency. Further, the constituting materials are carbonized by the heating, and carbide liberated during the carbonization process is caused to go into the gaps between the fibers by the pressure of generated gas, thereby increasing the clogging. The clogging causes carbon dioxide gas generated by heat decomposition to stay inside the structure of the incombustible sound absorption panel to act as inhibition of combustion of combustible gas. These actions work in combination to achieve provision of incombustibility.

Other functions of the chips will be described. When an acoustic wave hits the incombustible sound absorption panel 11, the acoustic wave goes into the fiber material surface in a direction indicated by an arrow in FIG. 1. The chips 15 are in a range surrounded by the sound absorption surface material 11, the honeycomb material 12, and the foam material 13. The acoustic wave, namely, air vibration received in this range causes chips to vibrate. This means that the acoustic wave is absorbed to convert acoustic wave energy to vibration energy. This energy is eventually emitted as heat energy. Namely, the chips fulfill sound absorption effect according to different principles from reflection absorption occurring in the gaps between the fibers of the aluminum fiber material or in tiny air bubbles of the foam material.

As a result of the foregoing actions for provision of incombustibility, the following achievements were accomplished.

Figure 8:
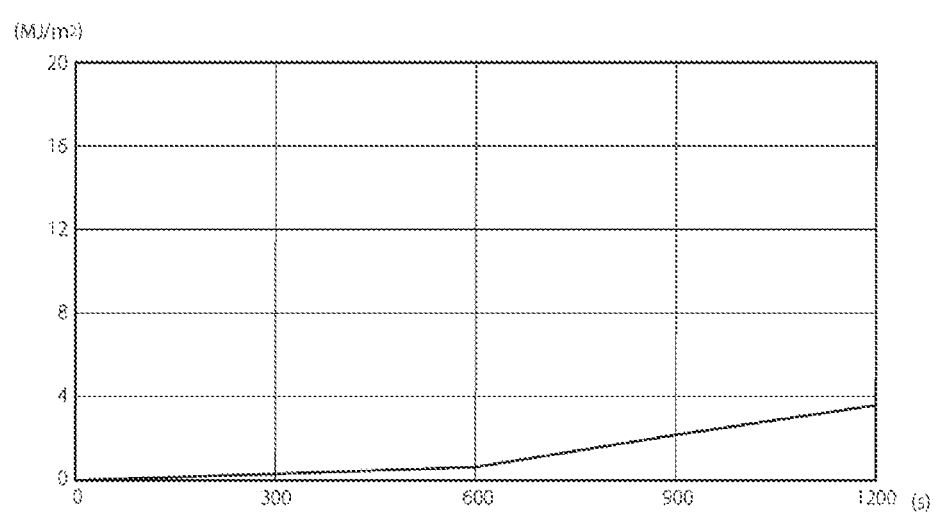
FIG. 8 is a graph of a curve of a total heat release value according to Example 1.
Figure 9:
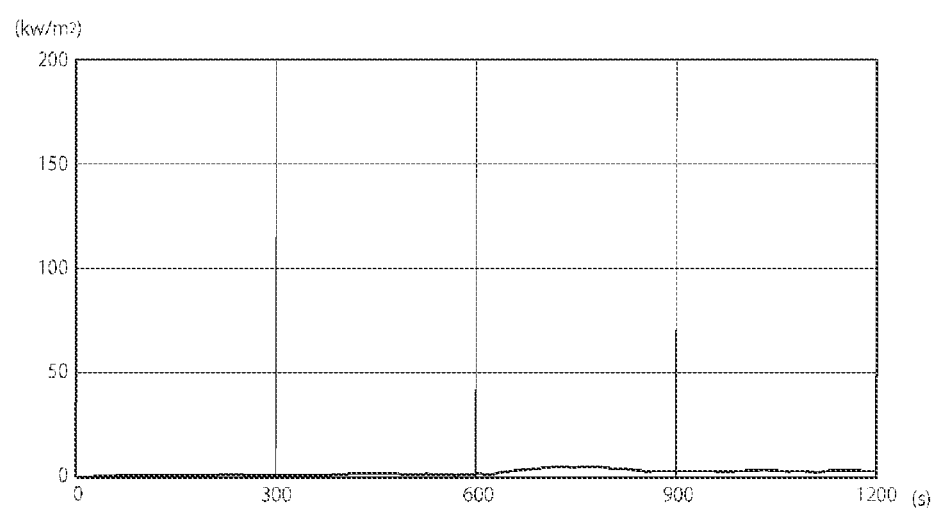
FIG. 9 is a graph of a curve of a heat release rate according to Example 1.

Regarding the criterion that "a total value of heat released in 20 minutes after start of heating should be up to 8 $MJ/m^2$," a result of up to 4 $MJ/m^2$ was obtained, as shown in FIG. 8. Regarding the criterion that "a maximum heat release rate should be controlled not to exceed 200 kW $m^2$ continuously for 10 seconds in 20 minutes after start of heating," a result of up to 10 $kW/m^2$ was obtained, as shown in FIG. 9.

Regarding the criterion that "the occurrence of a through crack and a through hole reaching a back surface harmful to fire protection should be prevented for 20 minutes after start of heating," a result showing the absence of a through crack and a through hole reaching a back surface harmful to fire protection was obtained.

Regarding "time of catching of fire," a result showing the absence of catching of fire was obtained.

The toxicity of gas generated on the occurrence of a fire was examined by conducting a survival test using mice. FIG. 7 shows result of survival times of the mice obtained by a testing device on mice. Gas concentration values in the testing device are $O_2$ (18.7%), $CO_2$ (1.46%), and CO (0.06%), and these concentrations correspond to the concentrations of gases generated during heating from an incombustible sound absorption panel as a measurement target. Eight mice were subjected to the survival test under this environment to produce a result that all the mice survived for 14.7 minutes or longer on average. This result exceeds 6.8 minutes defined as a determination criterion value. Based on this result, the safety of the gases generated from the incombustible sound absorption panel was confirmed. The test for confirming survival was conducted for 15 minutes.

The Industrial Safety and Health Regulations define criteria as no-go concentrations including a carbon dioxide gas concentration of equal to or greater than 1.5% and an oxygen concentration of less than 18%. Actually measured values of the concentrations of gases generated during heating from the incombustible sound absorption panel as a measurement target include a carbon dioxide gas of 1.46% and oxygen of 18.7% to fulfill these criteria.

Example 2

Figure 3:
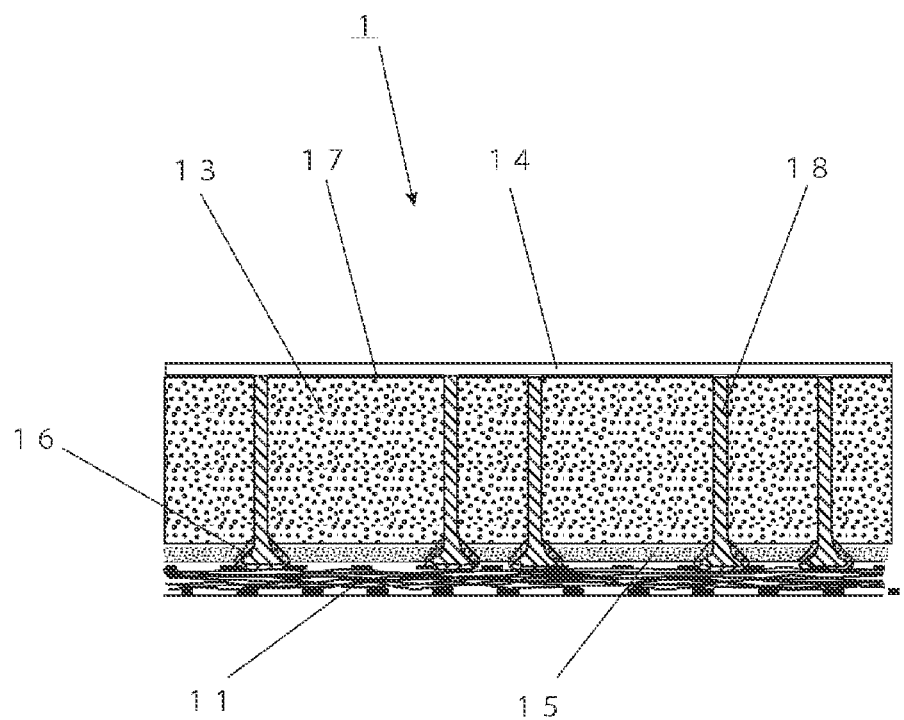
FIG. 3 is a cross-sectional view of an aluminum honeycomb material.

As shown in FIG. 3, in a second incombustible sound absorption panel according to this example, a honeycomb material is made of aluminum as an incombustible material. The other materials and structures are same as those in Example 1. The second incombustible sound absorption panel has a thickness of 32.8 mm and a weight of 8 kg/m$^2$.

This second incombustible sound absorption panel 2 fulfill a heating test defined as a test in Article 2, Item 9 of the Building Standards Act as shown in the results listed below.

Figure 11:
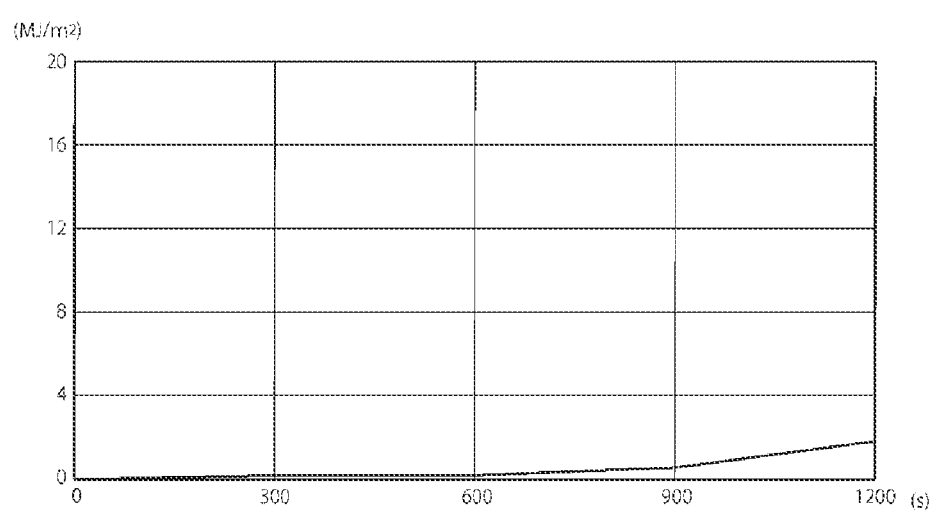
FIG. 11 is a graph of a curve of a total heat release value according to Example 2.
Figure 12:
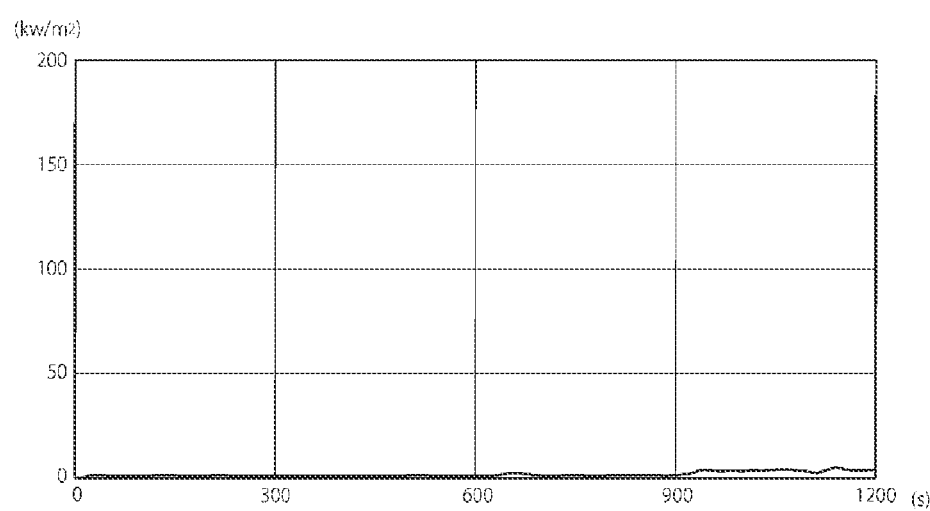
FIG. 12 is a graph of a curve of a heat release rate according to Example 2.

Regarding the criterion that "a total value of heat released in 20 minutes after start of heating should be up to 8 MJ/m$^2$," a result of up to 4 MJ/m$^2$ was obtained, as shown in FIG. 11. Regarding the criterion that "a maximum heat release rate should be controlled not to exceed 200 kW m$^2$ continuously for 10 seconds in 20 minutes after start of heating," a result, of up to 10 kW/m$^2$ was obtained, as shown in FIG. 12. Regarding the criterion that "the occurrence of a through crack and a through hole reaching a back surface harmful to fire protection should be prevented for 20 minutes after start of heating," a result showing the absence of a through crack and a through hole reaching a back surface harmful to fire protection was obtained.

Regarding "time of catching of fire," a result showing the absence of catching of fire was obtained.

The foregoing data shows that no notable difference in incombustibility performance was recognized between the incombustible sound absorption panel of Example 1 using the magnesium silicate honeycomb and the second incombustible sound absorption panel of this example using the aluminum honeycomb.

Specifically, obtaining clogging effect at the aluminum fiber material part is determined to be more important than selecting a material of the honeycomb material.

Gas concentration values obtained by heating the second incombustible sound absorption panel were $O_2$ (18.9%), $CO_2$ (1.34%), and CO (0.03%). As shown in FIG. 10, eight mice were subjected to a survival test under this environment to produce a result that all the mice survived for 12.29 minutes or longer on average, which exceeds 6.8 minutes defined as a determination criterion value. Based on this result, the safety of the gases generated from the panel was confirmed.

REFERENCE SIGNS LIST

1 incombustible sound absorption panel
11 Sound absorption surface material
12 Honeycomb material
13 Foam material
14 Sound insulation material
15 Chip
15*a* Chip moved by water vapor
15*b* Chip moved by gas resulting from heat decomposition
15*c* Chip moved in outgoing test
16 Emulsion-based adhesive
17 Epoxy-based adhesive
18 Aluminum honeycomb material
19 Frame
2 Incombustible sound absorption panel
3 Press
31 Lower press platen
32 Upper press platen
4 Air suction device
5 Particle counter
6 Air flow path

The invention claimed is:

1. An incombustible sound absorption panel wherein
   a honeycomb material is filled with a foam material to form a core,
   a sound absorption surface material as an air-permeable fiber material is arranged on one surface of the honeycomb material and a sound insulation material without air permeability is arranged on an opposite surface of the honeycomb material, and the honeycomb material filled with the foam material, the sound absorption surface material and the sound insulation material adhesively bonded with an adhesive,
   a layer of chips of the foam material is arranged between the foam material filling the honeycomb material and the sound absorption surface material, and
   when the chips are heated, the chips act as a blocking material filling a gap between fibers of the sound absorption surface material to generate a state of oxygen deficiency.

2. The incombustible sound absorption panel according to claim 1, wherein
   the foam material has an open-cell structure and is a non-electrostatic rigid phenolic foam material.

3. The incombustible sound absorption panel according to claim 2, wherein
   when the panel is heated, some of the chips move into the gap between the fibers of the air-permeable fiber material to become a clogging material that limits air flow, and the foam material and the chips generate inert gas by being burned by heat, and
   the clogging at the fiber material causes the inert gas to fill a void in the foam material, thereby inhibiting combustion.

4. The incombustible sound absorption panel according to claim 1, wherein
   the core is composed of the honeycomb material, the foam material, and the adhesive that generate carbon dioxide gas when heated.

5. The incombustible sound absorption panel according to claim 1, wherein
   the core is composed of the honeycomb material, the foam material, and the adhesive that generate a carbonized material when heated.

6. The incombustible sound absorption panel according to claim 1, wherein
the honeycomb material has a composition including 70 to 80 wt % of magnesium silicate hydrate, 3 to 5 wt % of silica, 14 to 24 wt % of pulp, and 1 to 3 wt % of other organic matters.

7. The incombustible sound absorption panel according to claim 1, wherein
adhesive for adhesive bonding between a tip of the honeycomb material and the sound absorption surface material is an emulsion-based adhesive, and
an application amount of the emulsion-based adhesive is in a range from 60 to 120 g/m2.

8. The incombustible sound absorption panel according to claim 1, wherein
adhesive for adhesive bonding between a tip of the honeycomb panel and the sound insulation material is an epoxy-based adhesive,
the epoxy-based adhesive has a composition including 44 to 49% of an inorganic filler, and
an application amount of the epoxy-based adhesive is in a range from 200 to 350 g/m2.

9. The incombustible sound absorption panel according to claim 1, wherein
the air-permeable fiber material is an aluminum fiber material or a needle mat fiber material that consists of glass wool or rock wool, and
a fiber diameter is equal to or less than 100 μm and a space gap between fibers is equal to or less than 100 μm.

10. The incombustible sound absorption panel according to claim 1, wherein
a thickness of the foam material filling the honeycomb material is smaller than a thickness of the honeycomb material.

\* \* \* \* \*